US009080503B2

(12) United States Patent
Buschur et al.

(10) Patent No.: US 9,080,503 B2
(45) Date of Patent: Jul. 14, 2015

(54) HYDRAULIC TURBO ACCELERATOR APPARATUS

(75) Inventors: Jeffrey J. Buschur, Lake Orion, MI (US); Richard S. Leemhuis, Rochester Hills, MI (US); Donald G. Shloff, Rochester Hills, MI (US)

(73) Assignee: Hydracharge LLC, Auburn Hills, MI (US)

( * ) Notice: Subject to any disclaimer, the term of this patent is extended or adjusted under 35 U.S.C. 154(b) by 51 days.

(21) Appl. No.: 13/511,085

(22) PCT Filed: Dec. 8, 2010

(86) PCT No.: PCT/US2010/003123
§ 371 (c)(1),
(2), (4) Date: May 21, 2012

(87) PCT Pub. No.: WO2011/071529
PCT Pub. Date: Jun. 16, 2011

(65) Prior Publication Data
US 2012/0266595 A1    Oct. 25, 2012

Related U.S. Application Data

(60) Provisional application No. 61/283,697, filed on Dec. 8, 2009.

(51) Int. Cl.
*F02B 37/10* (2006.01)
*F02B 39/08* (2006.01)

(52) U.S. Cl.
CPC .............. *F02B 39/08* (2013.01); *F02B 37/10* (2013.01); *F02B 39/085* (2013.01); *Y02T 10/144* (2013.01)

(58) Field of Classification Search
CPC ........ F02B 37/10; F02B 39/085; F02B 39/08; Y02T 10/144

USPC ......... 60/606–609, 611, 624; 123/559.1, 561, 123/559.3; 417/53, 423.6, 236; 75/15.86, 75/438
See application file for complete search history.

(56) References Cited

U.S. PATENT DOCUMENTS

| 2,068,914 A | 1/1937 | Handley |
| 3,389,554 A | 6/1968 | Wolf |

(Continued)

FOREIGN PATENT DOCUMENTS

| JP | 08074608 A * | 3/1996 | ............. F02D 13/02 |
| WO | WO 2009/136994 A1 | 11/2009 | |

OTHER PUBLICATIONS

English translation of JP 08074608 A.*

*Primary Examiner* — Kenneth Bomberg
*Assistant Examiner* — Jason T Newton
(74) *Attorney, Agent, or Firm* — J. Gordon Lewis

(57) ABSTRACT

A hydraulic drive assists to increase the acceleration rate of a turbocharger impeller/turbine shaft assembly and provide a secondary means of driving the compressor impeller at lower engine speeds where exhaust gases alone does not generate adequate shaft speeds to create significant induction boost. The hydraulic circuit includes a dual displacement motor, which provides high torque for acceleration yet converts to a single motor for high-speed operation. When the exhaust driven turbine function allows compressor speeds, beyond which the hydraulic system can contribute, a slip clutch allows disengagement of the hydraulic drive. The hydraulic circuit is integrated with the power steering circuit to conserve energy and supportive components such as lines and reservoir. In an alternative embodiment, there is no turbocharger and the hydraulic drive provides means of forced induction air alone.

22 Claims, 9 Drawing Sheets

(56) References Cited

U.S. PATENT DOCUMENTS

| | | | |
|---|---|---|---|
| 3,421,389 A * | 1/1969 | Fauchere | 74/665 P |
| 3,495,418 A | 2/1970 | Kapich | |
| 3,869,866 A * | 3/1975 | Timoney | 60/607 |
| 3,927,530 A | 12/1975 | Braun | |
| 4,083,188 A | 4/1978 | Kumm | |
| 4,188,918 A | 2/1980 | Robbins, Jr. | |
| 4,285,200 A | 8/1981 | Byrne et al. | |
| 4,309,972 A | 1/1982 | Vallance et al. | |
| 4,322,949 A | 4/1982 | Byrne et al. | |
| 4,444,014 A | 4/1984 | Kobayashi et al. | |
| 4,478,043 A | 10/1984 | Kobayashi et al. | |
| 4,622,817 A * | 11/1986 | Kobayashi | 60/608 |
| 4,729,225 A | 3/1988 | Bucher | |
| 4,803,969 A * | 2/1989 | Hiereth et al. | 123/561 |
| 4,969,332 A * | 11/1990 | Nancarrow et al. | 60/608 |
| 4,996,844 A | 3/1991 | Nancarrow | |
| 5,003,772 A * | 4/1991 | Huber | 60/259 |
| 5,076,060 A | 12/1991 | Adeff | |
| 5,113,658 A | 5/1992 | Kobayashi | |
| 5,346,364 A | 9/1994 | Kapich | |
| 5,375,419 A | 12/1994 | Wright et al. | |
| 5,421,310 A | 6/1995 | Kapich | |
| 5,471,965 A | 12/1995 | Kapich | |
| 5,535,845 A | 7/1996 | Buschur | |
| 5,561,978 A | 10/1996 | Buschur | |
| 5,669,461 A | 9/1997 | Buschur | |
| 5,687,568 A * | 11/1997 | Buschur | 60/424 |
| 5,713,204 A * | 2/1998 | Kadlicko | 60/608 |
| 5,724,949 A | 3/1998 | Liang | |
| 5,729,978 A * | 3/1998 | Hiereth et al. | 60/607 |
| 5,776,031 A * | 7/1998 | Minowa et al. | 477/155 |
| 5,778,693 A | 7/1998 | Mientus | |
| 5,881,630 A | 3/1999 | Buschur et al. | |
| 5,904,045 A | 5/1999 | Kapich | |
| 5,924,286 A * | 7/1999 | Kapich | 60/608 |
| 5,937,832 A | 8/1999 | Kapich | |
| 5,937,833 A | 8/1999 | Kapich | |
| 5,946,911 A | 9/1999 | Buschur et al. | |
| 5,960,628 A * | 10/1999 | Machesney et al. | 60/424 |
| 5,960,748 A | 10/1999 | Lewis | |
| 5,996,701 A * | 12/1999 | Fukasawa et al. | 172/2 |
| 6,016,657 A | 1/2000 | Buschur | |
| 6,021,641 A | 2/2000 | Buschur et al. | |
| 6,041,602 A * | 3/2000 | Dickey | 60/605.2 |
| 6,092,371 A | 7/2000 | Feucht et al. | |
| 6,139,740 A | 10/2000 | Oklejas | |
| 6,158,216 A | 12/2000 | Buschur et al. | |
| 6,308,665 B1 | 10/2001 | Lewis | |
| 6,311,488 B1 * | 11/2001 | Maruta et al. | 60/450 |
| 6,412,278 B1 | 7/2002 | Matthews | |
| 6,502,398 B2 | 1/2003 | Kapich | |
| 6,612,822 B2 | 9/2003 | Buschur et al. | |
| 6,629,411 B2 | 10/2003 | Buscher et al. | |
| 6,681,568 B2 * | 1/2004 | Smith | 60/422 |
| 6,715,289 B2 | 4/2004 | Mader et al. | |
| 7,111,704 B2 | 9/2006 | Johnson | |
| 7,155,907 B2 * | 1/2007 | Desjardins et al. | 60/420 |
| 7,360,357 B2 * | 4/2008 | Zahniser | 60/421 |
| 7,481,056 B2 | 1/2009 | Blaylock et al. | |
| 7,490,594 B2 | 2/2009 | Van Dyne et al. | |
| 7,608,011 B2 | 10/2009 | Grabowski et al. | |
| 2003/0005695 A1 * | 1/2003 | Allen et al. | 60/608 |
| 2003/0188535 A1 * | 10/2003 | Mader et al. | 60/612 |
| 2005/0217260 A1 * | 10/2005 | Desjardins et al. | 60/421 |
| 2005/0223706 A1 * | 10/2005 | Mitchell et al. | 60/606 |
| 2006/0032225 A1 * | 2/2006 | Dyne et al. | 60/607 |
| 2008/0098969 A1 * | 5/2008 | Reed et al. | 123/64 |
| 2008/0210205 A1 * | 9/2008 | Baek | 123/565 |
| 2010/0263375 A1 | 10/2010 | Grieve | |
| 2011/0276204 A1 * | 11/2011 | Shutty et al. | 701/22 |
| 2014/0182545 A1 * | 7/2014 | Venton-Walters et al. | 123/337 |
| 2014/0182564 A1 * | 7/2014 | Venton-Walters et al. | 123/564 |

* cited by examiner

HYDRAULIC TURBO ACCELERATOR APPARATUS

RELATED PATENT APPLICATION

This application claims priority to U.S. provisional patent application Ser. No. 61/283,697 filed 8 Dec. 2009, entitled "Hydraulic Turbo Accelerator Apparatus".

TECHNICAL FIELD

Many automotive engines, particularly diesels, are equipped with a method of boosting the inlet air density in order achieve greater power per unit engine displacement. The large majority of these systems are turbocharged diesels with a smaller market share consisting of supercharged gasoline power trains. Turbochargers have an efficiency advantage in that the power to drive the air compressor is obtained from exhaust energy, which is preferable to accessory belt loading, however they struggle with response issues, which limit vehicle acceleration capabilities. Further, the increased exhaust pressures and temperatures incurred with turbocharger applications lead to heavier exhaust systems which, along with the thermal mass of the turbocharger itself, tend to create emissions issues as the "light-off" of the catalytic converter is delayed.

Turbochargers also have some limitations as to the boost levels available at lower engine speeds due to limited exhaust gas velocity and efficient system design. Turbocharger technology is being enhanced to overcome these obstacles by means such as "starter/low end turbos" and variable vane/variable nozzle geometries. These smaller improvements however lead to additional restriction and thermal mass which exacerbate the aforementioned emissions issues.

Recently, with the renewed emphasis on energy conservation, there is much focus on using turbochargers to allow smaller engines in like sized vehicles thus increasing fuel efficiency. These downsizing efforts are primarily directed to gasoline engines where larger operating speed ranges make these issues more pronounced than in diesel engines.

BACKGROUND OF THE INVENTION

Centrifugal compressors are well known in the industry as a source of compressed air for forced induction of air into an internal combustion engine. Their simplicity of construction and high efficiencies make them desirable as air pumps for these applications. Generally, they are powered by an exhaust gas turbine in a configuration very commonly known as turbochargers. Slow acceleration of these turbines known as "turbo lag" has always been an issue as turbine devices, although capable of large power output at very high speed, are low torque output devices on relative scale to positive as "turbo lag" has always been an issue as turbine devices although capable of large power output at very high speed are low torque output devices on relative scale to positive displacement devices such as gear, gerotor, vane or piston hydraulic motors.

Several patents relate to turbine type hydraulic devices to accelerate the turbo rotating assembly. Examples are:

U.S. Pat. No. 5,113,658 to R. Kobayashi describes a hydraulic assist turbocharger system operative to supply charge air to a combustion engine. The system includes at least one turbocharger having a hydraulic assist turbine adapted to be driven by a pressurized hydraulic fluid to supplementally drive the turbocharger during selected engine operating conditions when supplemental charge air is required. Hydraulic fluid flow is regulated by an electrohydraulic control valve responsive to control signals from a main controller, wherein the control signals and corresponding control valve operation may be independent of engine speed and load. In addition, the hydraulic fluid is supplied to the hydraulic assist turbine via a dual segment nozzle, with selector valves coupling the fluid for passage through one or both nozzle segments in accordance with engine charge air requirements.

U.S. Pat. No. 4,083,188 to E. Kumm describes a system for supercharging a low compression Diesel engine. The system includes connected turbine and compressor elements and a hydraulic system having a first motor/pump unit mechanically connected with the turbine and compressor elements and a second motor/pump unit mechanically connected, through an output transmission, to an engine. The hydraulic system also includes a plurality of valves, an accumulator, a reservoir, and ducts connecting such elements and the motor/pump units. The first motor/pump unit is of the variable volume type and is controlled by an actuator responsive to fluid pressures in the inlet and exhaust manifolds of the engine. The second motor/pump unit is a fixed displacement device which may be driven by fluid pressure from the accumulator in the engine starting phase and by the engine to supply hydraulic pressure to recharge the accumulator and assist in controlling the operation of the supercharger. The operation of the supercharger is also controlled in part by a valve mechanism responsive to fluid pressures generated by the motor/pump units during predetermined phases of engine operation.

U.S. Pat. No. 3,389,554 to G. Wolf describes a supercharged internal combustion piston engine having at least one exhaust-driven turbo compressor for supplying combustion air to the engine. The turbo compressor is provided with an auxiliary drive for supplying additional power thereto, the auxiliary drive comprising a hydraulic volumetric motor unit coupled directly to the turbo compressor, and a power driven pump unit connected by appropriate hydraulic conduits to the hydraulic motor unit and to a reservoir for hydraulic fluid. The hydraulic conduit leading to the hydraulic motor unit is connected to a source of air by means of an air conduit. The air conduit is provided with a normally closed pressure actuated valve whish is adapted to open when the pressure on the pressure-responsive actuating mechanism of the valve reaches a predetermined value. When the pressure actuated valve is thus opened, air or a mixture of air and hydraulic fluid flows through the motor unit.

U.S. Pat. No. 3,869,866 to S. Timoney describes drives and controls for an exhaust gas turbocharger for an internal combustion engine in which the turbocharger is primarily driven by exhaust gases from the engine and includes an auxiliary hydraulic turbine which also has a driving connection to the turbocharger and which receives pressurized fluid from a fixed displacement pump to drive the turbine during certain operating conditions of the engine. The pump is connected to a rotary output shaft of the engine by means of a clutch member which selectively connects and disconnects the pump in response to a preselected operating characteristic of the engine. Such operating characteristic is selected from the group consisting of at least one of the engine speed, oil pressure, air manifold pressure, and fueling rate characteristics of the engine. In one embodiment, the clutch is disconnected after the engine reaches a predetermined operating speed, as measured by a sensing unit or tachometer responsive directly to engine shaft speed, by sensing the pressure at which the fluid is discharged from the pump and which corresponds to the preselected engine speed. In another embodiment, the clutch control is also responsive to one of the operating characteristics of the engine for automatically disengaging the clutch in response to load conditions below a selected predetermined minimum, for example when the engine fuel depend rate is below 80 percent of the demand rate for maximum torque at a particular speed.

U.S. Pat. No. 3,927,530 to A. Braun describes a supercharged internal combustion engine having an exhaust-driven turbocharger for supplying combustion air to the engine and auxiliary power means for additionally applying a driving force to the compressor under occasional and otherwise normally deficient combustion air conditions, to provide the desired amount of combustion air for proper combustion. The power means includes a hydraulic assist motor mechanically coupled with the turbocharger and a hydraulic pump connected by a fluid flow passageway with the motor and permanently coupled with a drive shaft of the engine. The pump is connected through a selector valve to the oil in the reservoir of the engine's crankcase or to the vapor chamber above the oil level in the reservoir or to the atmosphere. The selector valve may be manually controlled or automatically controlled by a sensor responsive to one or more of such engine conditions as manifold air pressure, engine speed, etc. The valve may also have a bleed passageway therein that connects with the oil reservoir when the pump is pumping vapor or air to assure adequate lubrication of the pump and, if need be, the hydraulic motor.

U.S. Pat. No. 7,490,594 B2 to E. Dyne et al. describes a device combining the features of a supercharger, a turbocharger and turbo-compounding into one system, utilizing a hydraulic or mechanical continuously variable transmission to drive the turbocharger up to a specific speed or intake manifold pressure and then holding the ideal speed to keep it at the right boost pressure for the engine condition. The benefits of a supercharger, which is primarily good for high torque at low speed, and a turbocharger, which is usually only good for high horsepower at high speeds are merged. Once the exhaust energy begins to provide more work than it takes to drive the intake compressor, the device recovers that excess energy and uses it to add torque to the crankshaft. As a result, the device provides the benefits of low speed with high torque and the added value of high speed with higher horsepower or better fuel economy from a single system.

These forgoing known hydraulic turbines create more torque than an equivalent gas driven turbine as the density of the oil is roughly 1000 times greater than air, but still are relatively poor at creating angular acceleration. Positive displacement hydraulic devices create torque in proportion to applied pressure essentially independent of rotational speed or time variants.

Centrifugal compressors are also employed on some low volume OEM applications and aftermarket applications in a belt driven configuration. They create a very potent configuration in upper engine speed ranges but the inertia of the high speed impellers as reflected through their step up gearboxes to the drive pulley create exceedingly high loads on the belt upon rapid engine speed changes. They are also at the disadvantage that the pressure or boost created by the spinning impeller is a function of speed squared. Thus, it is a compromise as to the pulley ratio at which meaningful boost is created in the lower engine speed ranges without consuming huge amounts of power at high engine speeds.

U.S. Pat. No. 7,490,594 B2 teaches an elaborate mechanism in which a hydraulic motor is implemented either to provide or absorb power from a turbocharger shaft. The fixed displacement hydraulic motor is coupled to a variable pump/motor of piston and swash plate design which in turn is coupled to the engine such that energy can be effectively transferred in either direction. Given that the mechanism permanently couples the turbocharger shaft to the hydraulic drive, it would represent a large power loss in the operational region after the turbocharger is accelerated but before there is adequate power available to effectively transfer back to the engine. Further piston swash plate hydraulic devices are expensive devices and would limit the market appeal of such a system.

Unrelated to the field of force air induction for an internal combustion engine, U.S. Pat. No. 5,561,978 to Buschur and associated patents teach the use of two fixed displacement motors driving a common output shaft such that a pseudo variable displacement motor is produced.

U.S. Pat. No. 5,076,060 to Adeff teaches a control mechanism for a hydraulic assisted turbo which allows the driver to select a sport mode in which the hydraulics are activated. Upon subsequent mild use of the accelerator the hydraulics are de-activated after a period of time to reduce power consumption.

U.S. Pat. No. 4,729,225 to Bucher teaches a turbocharger energy recovery system in which a variable motor/pump coupled to the turbocharger shaft is utilized to either accelerate the turbocharger shaft through means of hydraulic flow generated by a pump powered in turn by an electric motor. Or, recover energy from the turbocharger shaft and turn a fixed displacement motor to drive auxiliary loads.

U.S. Pat. No. 4,083,188 to Kumm teaches a turbocharger coupled to a hydraulic motor/pump in fluid communication with a pump geared to the engine to maintain desired pressure differentials between engine intake and exhaust manifolds. An accumulator is employed to allow pressurized fluid to turn the pump coupled to the engine thus defining an alternate engine starting device.

The above-referenced patents typify the state of the art. Presently, vehicle manufacturers are downsizing internal combustion engines (Otto and Diesel cycle types) to meet fuel economy and emissions regulations. Forced air induction, typically accomplished through turbocharging, is becoming prevalent through-out the ground transportation (passenger vehicles and trucks) industry to maintain or even improve current levels of overall vehicle performance. Costs driven by emissions issues and lag reduction strategies place such turbo systems out of economic reach of low end standard equipment vehicles.

Commercial hydraulic hardware is typically too expensive and heavy for automotive use. Turbo systems often intrude on power-train emissions. The higher thermal mass and restriction of turbo equipped exhaust systems drive expensive add-ons to avoid retarding the light off of the catalytic converter. Solutions to reduce "turbo lag" such as sequential and variable designs raise costs and complexity while exacerbating these emissions issues. Superchargers provide the "off the line" torque drivers desire. Traditional belt driven superchargers provide the best "replacement for displacement", but are expensive, cumbersome to implement and take power pumping air even when not needed.

It is, therefore, a primary object of the present invention to re-deploy existing automotive radiator fan drive technology to provide a cost effective and easily implemented forced air induction solution suitable for low end standard equipment vehicles which simultaneously improves fuel economy and vehicle performance. The present invention provides components designed to be competitive in the "no frills" automotive radiator fan marketplace.

SUMMARY OF THE INVENTION

It is an object of the present invention to provide means to rapidly accelerate the rotating group of a turbocharger such that the lag that the driver experiences between throttle depression and engine power increase response is reduced.

A further object of the invention is to define a means by which meaningful pumping action "boost" can be achieved at lower ranges of engine speed where the operating speeds of the turbine driven compressor alone are not adequate to develop significant pressure differential to increase engine air induction.

It is yet another object of this invention to define means in which a centrifugal compressor can be powered by hydraulic means alone in a manner, which can be responsive and efficient across all operating speed, ranges.

It is yet still a further object to define a means by which these objectives can be met by a hydraulic system which is integrated to the power steering assist circuit to reduce hardware and increase overall system efficiency.

It is a final object of the invention to define a means by which a pressurized return can be accomplished to avoid cavitations in the pump while under high output flow conditions.

These and other features and advantages of this invention will become apparent upon reading the following specification, which, along with the drawings, describes preferred and alternative embodiments of the invention in detail.

BRIEF DESCRIPTION OF THE DRAWINGS

The present invention will now be described, by way of example, with reference to the accompanying drawings, in which:

FIG. 5b, is a view of the boost nozzle from the pump in FIG. 5a;

FIG. 5c, is alternate pump configuration;

Although the drawings represent several embodiments of the present invention, the drawings are not necessarily to scale and certain features may be exaggerated in order to illustrate and explain the present invention. The exemplification set forth herein illustrates embodiments of the invention, in several forms, and such exemplifications are not to be construed as limiting the scope of the invention in any manner.

DESCRIPTION OF THE PREFERRED EMBODIMENT

The present invention is identified by the applicant as a HydraCharger™ or forced air induction system, which redeploys existing automotive radiator fan drive technology. The forced air induction system is cost effective and easily adaptable for a wide range of vehicle applications. The system is electronically controlled, hydraulically powered and remotely mounted for easy packaging. Independence from the vehicle engine and exhaust reduces vehicle level costs and avoids adverse emissions issues.

The present invention provides supercharger response on electronic command. The forced air induction system's variable positive displacement hydraulic drive delivers full torque virtually instantaneously upon command from an associated electronic control module (ECM). This accelerates a reliable, efficient and low cost centrifugal compressor to a speed required to create boost in under 300 ms. At low throttle demand, the engine returns to naturally aspirated mode through the unpowered compressor wheel.

The present invention can be implemented with a stand alone power source on a vehicle accessory drive. However, integration to a traditional hydraulic steering system, as on automotive fan drives, is more cost effective and may be a better overall alternative to an electric power steering and turbo combination.

The present invention is intended for application in varied automotive vehicle applications and will be described in that context. It is to be understood, however, that the present invention could also be successfully applied in many other applications. Accordingly, the claims herein should not be deemed limited to the specifics of the preferred embodiments of the invention describer hereunder.

Figure 1:
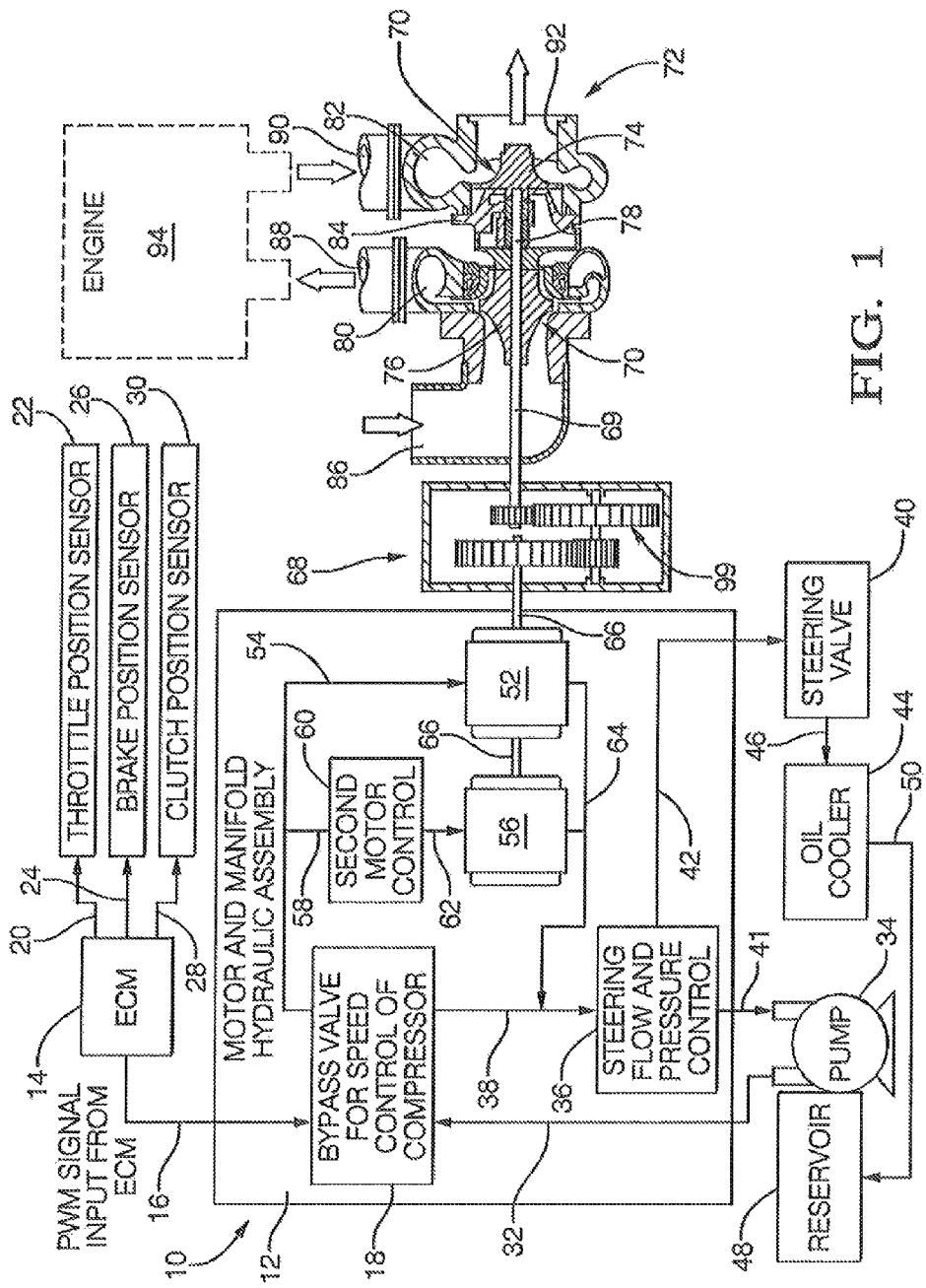
FIG. 1, is an overall view of the circuit and turbo mechanism at vehicle level.

Referring to FIG. 1, a functional schematic of a supercharger drive/accelerator circuit 10 embodying the present invention is illustrated. The supercharger drive/accelerator circuit 10 is substantially integrated within a motor and manifold hydraulic assembly 12. The motor and manifold hydraulic assembly 12 receives PWM input control signals from an electronic control module (ECM) 14 via an input line 16 feeding a bypass valve 18 for speed control of a compressor within the motor and manifold hydraulic assembly 12. The ECM 14 is typically part of the controller of a host vehicle (not illustrated) or, can be a dedicated portion of the supercharger drive/accelerator circuit 10.

The ECM 14 has numerous power and control signal feeds, including a feed line 20 from a host vehicle throttle (pedal) position sensor 22, a feed line 24 from a host vehicle brake condition sensor 26, and a feed line 28 from a host vehicle clutch condition sensor 30. Thus configured, the PWM input signal(s) include information relating to vehicle operator speed/(de)acceleration demand, as well as information anticipatory of a driver's intention to alter speed/(de)acceleration demand by activating brake and/or clutch control momentarily before modulating the vehicle throttle, enabling a "sport mode" and a separate "economy mode" of system control.

The bypass valve 18 receives pressurized hydraulic fluid via a conduit 32 from a system feed pump 34. The bypass valve 18 has a first output port feeding hydraulic fluid to a steering flow and pressure control circuit 36 through a conduit 38. The steering flow and pressure control circuit 36 has a first hydraulic fluid outlet interconnected with an inlet port of the pump 34 through a conduit 41. The steering flow and pressure control circuit 36 has a second hydraulic fluid outlet interconnected with an inlet port of a hydraulic power steering valve 40 of the host vehicle through a conduit 42. The steering valve 40 has an outlet port interconnected with an inlet port of an oil cooler 44 through a conduit 46. The oil cooler 44 has an outlet port interconnected with a reservoir 48 through a conduit 50. The reservoir 48 is in assembly with the pump 34 to act as an accumulator/buffer and to return hydraulic fluid to the pump 34.

The bypass valve 18 has a second output port feeding hydraulic fluid in parallel to the inlet port of a first or primary hydraulic motor 52 through a conduit 54, and to the inlet port of a secondary hydraulic motor 56 through a series interconnected first conduit 58, a second motor control circuit 60, and a second conduit 62. The outlet ports of both hydraulic motors 52 and 56 are commonly fed to the inlet port of the steering flow and pressure control circuit 36 through a conduit 64. The hydraulic motors can be of a number of types such a positive, variable or defined displacement type.

Thus constructed, the circuit 10 employs common components to define a power steering hydraulic control circuit and a forced air induction system hydraulic control circuit for a common host vehicle.

The hydraulic motors 52 and 56 have a common or unitary output drive shaft 66 providing a driven input to a speed step-up or speed increaser mechanism 68 which, in turn, has an output drive shaft 69 which drives the rotating assembly 70 of a turbocharger 72. The rotating assembly 70 comprises a turbine wheel 74 and a compressor wheel 76 connected on opposite ends of a common turbocharger shaft 78. The shaft 78 is rotatably supported by a pair of journal bearings and an associated thrust bearing unit within a center housing 84. The turbine and compressor wheels 74 and 76 are positioned respectively within turbine and compressor housings 82 and 80 respectively which are mounted onto a center housing 84 in a conventional manner. The turbine housing 82 includes an engine exhaust gas inlet port 90 and an exhaust gas outlet port 92. Likewise, the compressor housing 80 includes an air inlet port 86 and an air outlet port 88. Ports 90 and 92, and ports 88 and 86, respectively, are in fluid communication with the exhaust and air induction systems of a host vehicle internal combustion engine 94 in a known manner.

With the exceptions described herein, the turbocharger 72 employed in the present invention is substantially similar to known designs described in the art cited and incorporated herein. Accordingly, its detailed structural features will not be included here for the sake of brevity.

Figure 2:
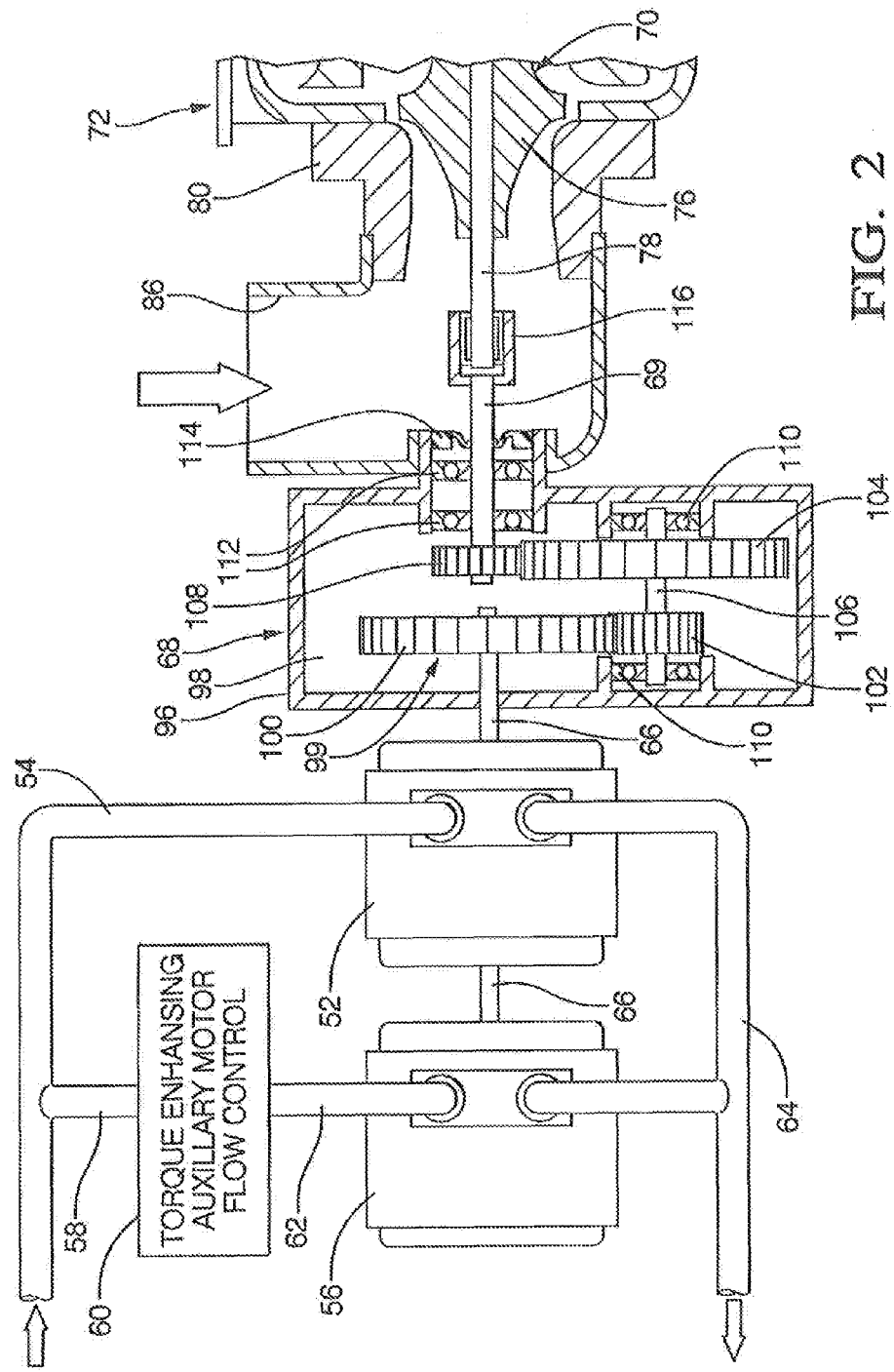
FIG. 2, is a more detailed view of the motor, gearbox and turbo interface.

Referring to FIG. 2, the speed step-up mechanism 68 includes a closed housing 96 forming a substantially sealed cavity 98 containing a speed increasing gear set 99 (preferably of the helical type) including an input gear 100 mounted and carried for rotation on the cantilevered end of the output drive shaft 66. The input gear 100 is in rolling engagement with a first idler gear 102 which is disposed for co-rotation with a second idler gear 104 on a common idler shaft 106. The second idler gear 104 is in rolling engagement with an output gear 108 mounted and carried for rotation on the cantilevered end of the output drive shaft 69. The opposed ends of the idler shaft 106 are supported by inner surface features of the housing 96 by roller bearings 110. Likewise, output drive shaft 69 is supported by inner surface features of the housing 96 by high speed roller bearings 112 and a seal 114.

The illustrated gear set 99 is intended to merely illustrate the functional concept of the speed step-up mechanism 68. As will be obvious to one skilled in the art, additional gear pairs can be added to gear set 99 to establish a desired step-up ratio, i.e. the number of rotations of output shaft 69 for each rotation of output drive shaft 66. The speed step-up mechanism 68 multiplies the controlled variable rotational rate (relatively slow) of the output drive shaft 66 affected by the two hydraulic motors 52 and 56 by a fixed ratio to a relatively high rate (turbine speed) of the output drive shaft 69.

The output drive shaft 69 of the speed step-up mechanism 68 is disposed coaxially with the common turbine shaft 78 and is releasably coupled thereto by an escapement mechanism 116 such as an over-driving slip clutch. The escapement mechanism 116 comprises a coupling carried for rotation with the output drive shaft 69 defining an engagement surface juxtaposed with the adjacent outer surface of the turbocharger shaft 78. When the instantaneous rotational speed of the output drive shaft 69 exceeds the instantaneous rotational speed of the turbocharger shaft 78, the two shafts 69 and 78 are effectively engaged for common rotation. When the instantaneous rotational speed of the output drive shaft 69 is less than the instantaneous rotational speed of the turbocharger shaft 78, the two shafts 69 and 78 are effectively released and are free to rotate at different speeds independently of one another. Thus, the hydraulic assembly 12 serves to "boost" the rotational speed of the turbocharger rotating assembly 70 at the low end of the engine speed range.

The embodiment of FIG. 1 includes:

(a.) A modified power steering pump, which may not include any valve functions or would have typical type construction flow control valve set in the range of 18-22 gpm, would be the fluid source. The pump relief valve, if any, would be set in the range of 1900-2500 psi. Typical power steering flow and relief settings are on the order of 2-4 gpm and 1100-1600 psi respectively. In a typical steering pump, a flow control device limits output with the excess being returned back to the inlet of the pump. Thus, the flow settings, which are many times normal, would not dictate a proportional increase in the pump's displacement but rather a reduction in bypass flow to the pump inlet. Oil would flow through to the motor and manifold hydraulic assembly.

(b.) At the hydraulic assembly the oil first is passed through the upper section of the circuit, which is the supercharger drive. Speed of the drive is controlled proportionally by the restriction of the valve assembly in parallel with the motors. Beyond the restriction of the parallel bypass there is another restriction in line with the second of the two motor assemblies driving the output shaft. Restriction of this second motor control valve determines the torque contribution of the second motor and the displacement ratios between the pump and compressor drive. There is a pressure relief mechanism, not shown in FIG. 1 which limits the maximum pressure at which the motor and hydraulic system can operate. In this manner, the torque to drive the pump can be limited as well to prevent excessive load and wear on the belt and bearings of the accessory drive. As the pressure drops across the first load in the series circuit, the pressure levels in this range would be typical of power steering systems applications.

(c.) Whether the flow has passed through the bypass or either of the two motors it is summed as it enters the lower load of the series circuit, which is the power steering load. The valve mechanism in this lower stage of the hydraulic assembly now sets the flow control and relief settings at levels typical for the steering system requirements as defined in paragraph b. above.

(d.) As pressures drop from the steering supply pressure levels to the return or tank pressures, the excess flow beyond the 2-4 gpm needed by typical steering systems is returned through an additional low-pressure return line.

(e.) Altogether the circuit configuration would require two additional lines over a traditional power steering circuit being the pump to hydraulic assembly line and the return line mentioned in paragraph f.

(f.) The oil cooler may now need to be enlarged as the circuit might be managing considerably more power.

(g.) It should be now noted and appreciated that the series circuit drive and steering system arrangement allows the steering system the same inputs and outputs as in a typical circuit. The pump now sees the combined pressure drop of the two. As the supercharger drive is operating at elevated pressures its shaft seal and bearings must practically be vented to tank pressure through detail not shown on FIG. 1.

It is key to the design that the dual motor arrangement provides for effectively changing the ratios of compressor drive speed to engine speed which makes for much more practical use of centrifugal compressors which are generally less expensive, more reliable and more efficient than fixed displacement designs such as Roots and Lyscolm screw designs typically used in belt driven supercharger applications. This accommodation of the centrifugal compressor is accomplished as follows.

For illustrative example, given a fixed displacement pump of 3 units displacement and primary hydraulic drive motor of 2 units displacement and finally the auxiliary or torque enhancing motor at 1 unit displacement the combinations are as follows. At lower engine speed the flow of 3 units per pump revolution being eventually restricted into only the primary motor would result in a maximum motor drive speed of 3/2 or 1.5× the pump speed. At higher engine speeds the auxiliary motor would be applied in parallel to the primary motor resulting in a motor speed to pump ratio of 3/(2+1) or 1× the pump speed. This is crucial as the ideal boost requirements of the engine would have compressor speed be constant across speed ranges, however as the mass airflow requirements of the engine would be proportional to the speed; the power required by the compressor increases also in proportion to engine speed. Thus, at higher engine speed the compressor has 3 units of motor displacement providing torque, thus approximately equalizing the pressure required on the motors across engine speeds. Essentially this provides the design equivalent of changing pulley ratios on a centrifugal design compressor between crank and compressor pulleys on the fly as engine speed increases.

The dual displacement motor and parallel bypass circuit arrangement in combination with the control strategy also provides an advantage for load acceleration. Until the speed of the output shaft is beyond that which can be supported by the pump flow, both motors can provide torque even if the final steady state speed results in all pump flow turning the smaller motor.

Figure 3:
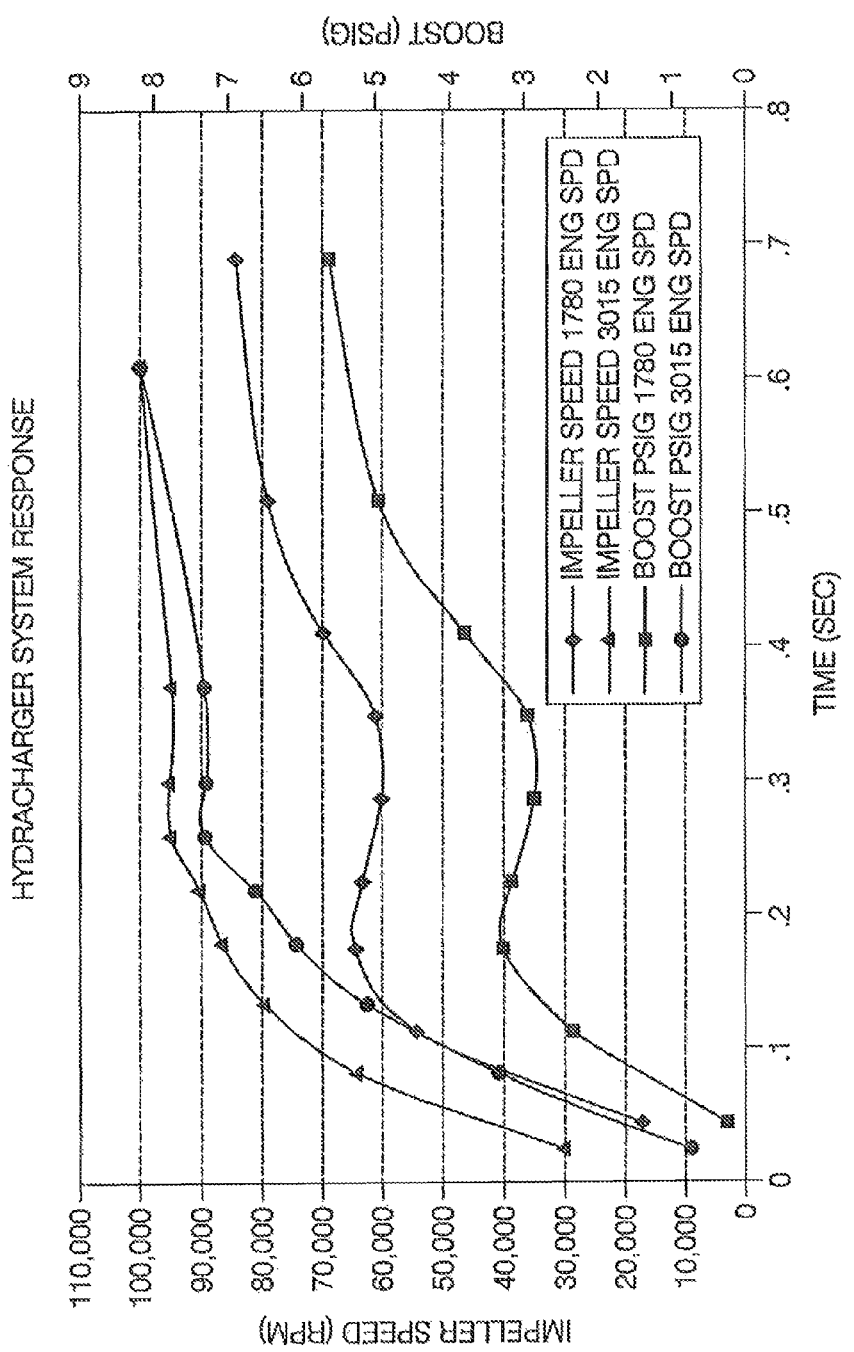
FIG. 3, a graph of test data indicating acceleration characteristics of the invention.

FIG. 3 illustrates the aforementioned characteristics. The graph indicates the compressor drive response at 1780 rpm and 3015 rpm engine speeds. The rise rate at the 3015 rpm condition is very responsive and is indicative of response when pump flow is adequate to employ both motors in steady state condition. The rise rate at the 1780 rpm test condition is initially similar, although slightly lower than the higher flow case, and indicates the torque contribution from both motors. As the speed of the compressor climbs it exceeds the speed which can be supported by flow to both motors in parallel. Acceleration is momentarily delayed as valves shift to direct flow to the primary motor and acceleration slope declines as now torque is only being contributed by one motor. The final speed is some 85% of the 3015 engine rpm case as opposed to the 59% expected strictly from engine speed ratios. Variance from ideal can be attributed to efficiency differences in the hardware between primary and auxiliary motors used at the time of testing.

Although the above describes the response of the system at steady engine speeds, in a vehicle acceleration state with rapidly increasing engine speed the functions described may be less obvious but contributing to performance nonetheless.

Confirming with analysis the acceleration capabilities of the described concept consider a hydraulic motor with a total displacement of 0.60 cubic inch per revolution (CIR), which is the sum of a 0.35 CIR primary motor and a 0.25 CIR auxiliary motor. At a pressure differential of 2000 psi this motor could theoretically produce:

$$T=\text{(pressure)}*\text{(displacement)}/(24\pi)=15.9 \text{ ft-lbs torque.}$$

Realistically at 85% mechanical efficiency this may yield 13.5 ft-lbs or 18.3 N-m.

Assuming a typical automotive turbocharger rotating group inertia of 3.0E-5 Kg-m^2 and a step up gear ratio of 1:20 yields an effective inertia of $Ie=(GR)^2*I=0.012$ kg-m^2.

Or an acceleration rate of: Ang-Accel (rad)=Torque/Inertia.

Or Acceleration=18.3/0.012=1525 rad/s^2.

Thus, a speed of 100,000 rpm could be achieved in <0.40 seconds which is just on the bounds or human perception of delay.

From the above considerations it can now be deduced that the ideal hydraulic centrifugal supercharger drive would be comprised of an infinitely variable pump and or motor. For example if a variable displacement motor were coupled to a fixed displacement pump the acceleration advantage, described for the dual displacement drive, could now be a continuously variable mechanism which started with a large motor displacement for maximum torque and reduced motor displacement to increase speed. Further it would be advantageous to be able to increase pump displacement to create more flow at lower engine speeds to increase the hydraulic power available to the motor. When the compressor drive is idle, such as at steady state road conditions, it would be advantageous to have the pump displacement decline in size to reduce parasitic pump loads.

Overall, aside from economic limitations on costs of motors and pumps, the logical practical limitation on such a hydraulic drive would be maximum system pressure allowance and sizing of lines defining a maximum flow. If for example the limitations were 3000 psi pressure and 20 gpm flow. The pump would be sized to provide 20 gpm at the lowest required engine speed and the motor would be large enough in displacement to create the highest useable torque for acceleration. As engine speed increased the pump would decline in displacement to maintain 20 gpm flow. Likewise the motor would be reduced in displacement to provide higher speeds to the compressor until the displacement was matched to the steady state torque requirement of the compressor at the maximum air mass flow and pressure ratio. Such a variable pump and motor system would fully utilize the 20 gpm flow and 3000 psi system capacities to accelerate the compressor and transfer power at the highest possible rate. This fully optimized system would however create controls issues aside from being extremely expensive.

Viewing now FIG. 2, a proposed interface of the hydraulic motors and turbocharger shaft are described. A housing comprising a gearbox cavity would adjoin the motor to the compressor housing. A precision-piloted interface would be employed to align the output shaft and clutch housing to an extension of the turbo shaft on the compressor end. Torque produced by the motors is stepped up in two stages each of approximately 1:4.5. Limitations of packaging and contact ratio of smaller gears make it likely that two stages will be required. Preferably helical gears would be employed to reduce noise. At the entry point of the motor output shaft into the compressor intake enclosure a seal would be employed which would increase seal to shaft pressure upon vacuum in the compressor intake or pressurization of the gearbox cavity. An over-riding slip clutch would couple the output shaft/clutch housing to the compressor shaft extension. The slip clutch would transfer torque from the motor to the compressor shaft but would allow override or slip as the turbine spins the compressor wheel faster than the speed provided by the hydraulic motor. Thus, as the driver depresses the accelerator the control algorithm in the engine controller would restrict the bypass in the hydraulic circuit forcing rapid acceleration of the motor and turbocharger shaft. As the turbine speed exceeds that of the motor output shaft the hydraulics would be deactivated by subsequent command from the engine controller to the hydraulic circuit bypass valve.

As an additional embodiment the turbine section of the compressor may be removed and the system could operate only on hydraulic power. In this manner the expense of the turbine and associated exhaust modifications could be removed. In any case the devices as described herein could eliminate the need for sequential turbocharger apparatus and very likely the need for expensive variable vane and variable geometry turbines.

Figure 4A:
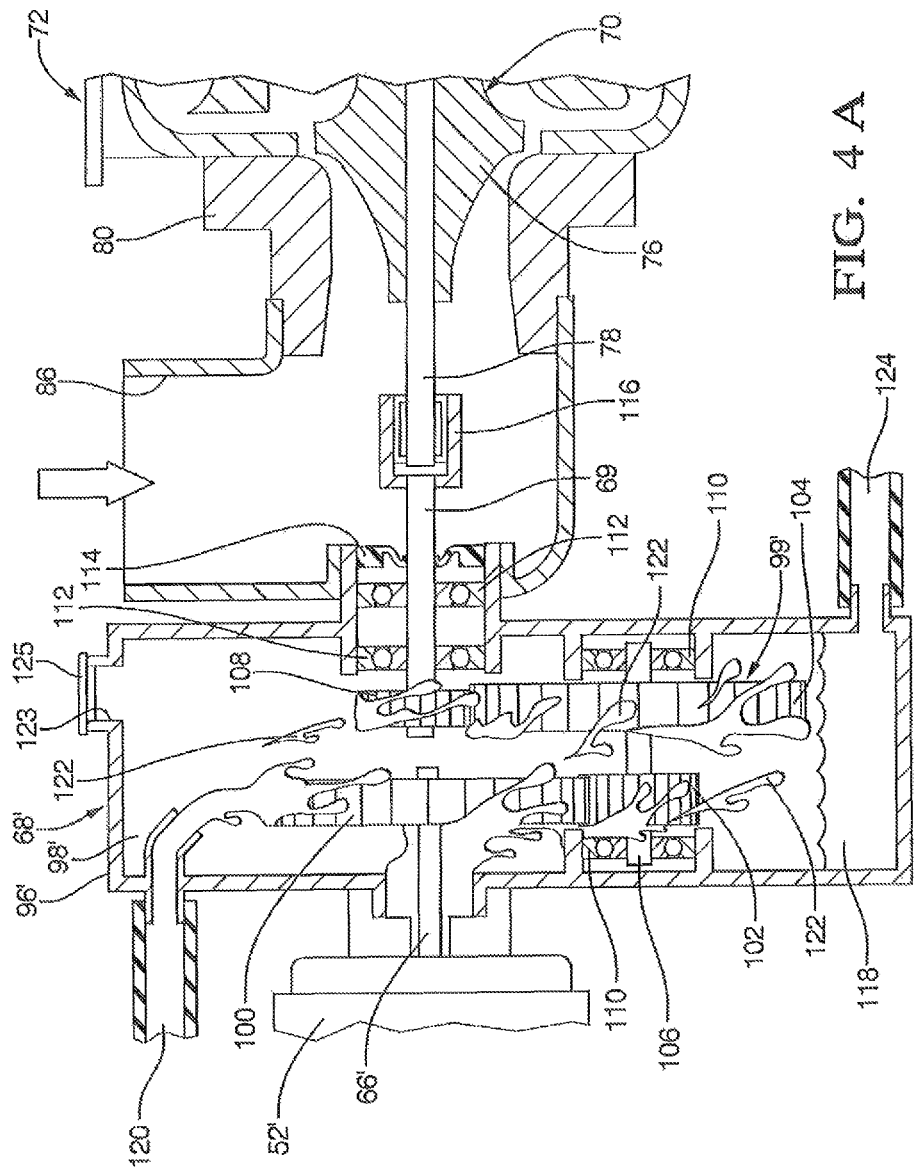
FIG. 4a, is an embodiment utilizing the gear enclosure as a reservoir.
Figure 4:
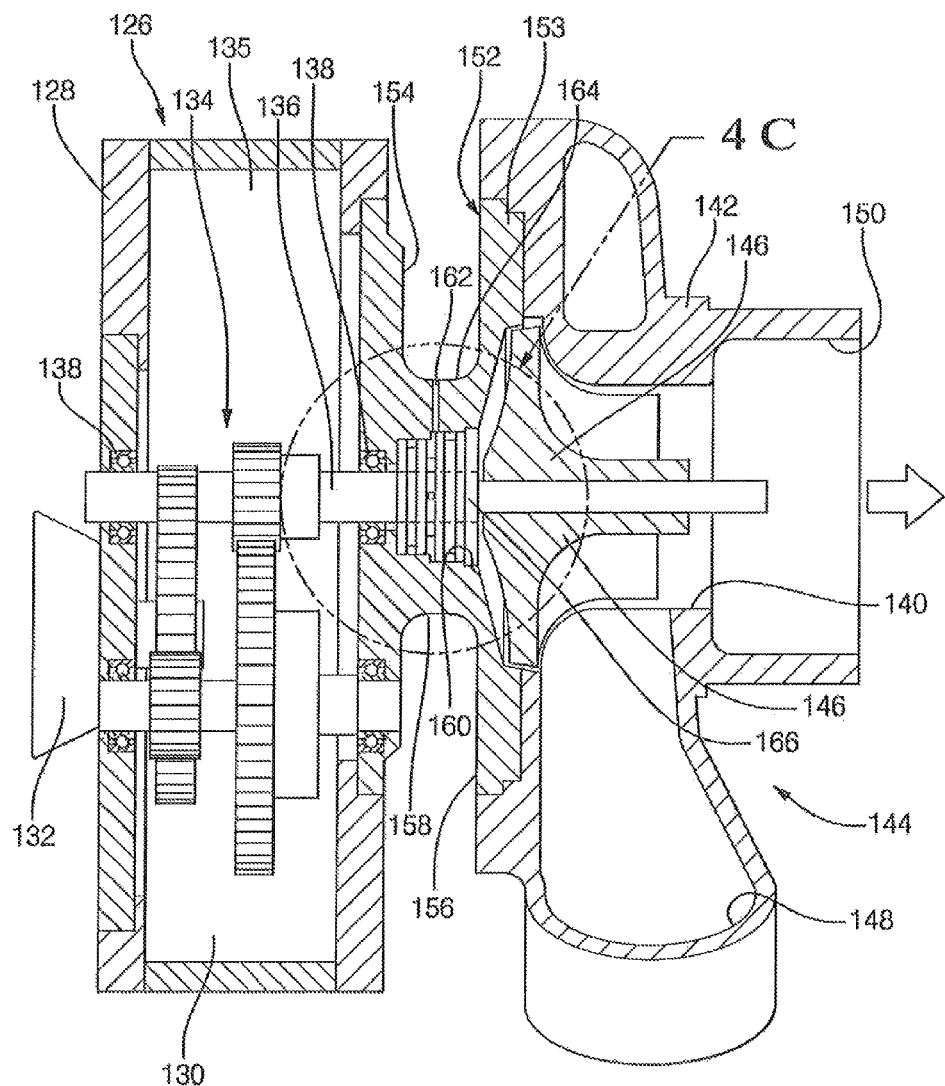
FIG. 4b, illustrates working design tested in vehicle.
FIG. 4c, defines a workable seal to isolate the hydraulic system from the air intake system.

Referring to FIG. 4A, the speed step-up mechanism 68 of FIG. 2 is modified as speed step-up mechanism 68' to increase the overall size of the closed housing 96' to expand the volume of the cavity 98' and thereby provide volume to maintain a reservoir 118 of hydraulic fluid therein beneath the gear set 99'. Returning hydraulic fluid enters the reservoir 118 via an inlet port 120 located above the gear set 99' and from the hydraulic motor 52' about the output drive shaft 66' thereof. As illustrated, hydraulic oil entering the cavity 98' will disperse into droplets 122 fully enveloping the gear set 99' and lubrication/cooling the relatively components thereof. An outlet port 124 enables drawing hydraulic fluid from the reservoir 118 for circulation within hydraulic assembly 12. Make-up hydraulic fluid can be added (or removed from) reservoir 118 via a fill opening 123 sealingly closed by a removable cap 125.

In the enhanced embodiment depicted in FIG. 4A, there is shown a means by which the step up mechanism enclosure or gearbox could be employed to serve as the hydraulic system reservoir. This would facilitate not only elimination of the existing reservoir but allow for flow lubrication of the gear mesh points without windage loss of submerging the gears. It also could allow for the elimination of the hydraulic motor assembly shaft seal by allowing the bearing leakage flow to move directly into the reservoir. Further it can be understood that the return flow from the steering system could be routed through the turbocharger bearing housing if avoidance of typical use of engine oil as bearing lube is desired.

FIG. 4B is an overview of engineering drawings used in the test vehicle where a 2 stage step gear mechanism 126 is housed within an enclosure 128 comprising the system reservoir 130. A hydraulic drive motor 132 provides an input drive to a gear set 134 disposed within a cavity 135 defined by enclosure 128. A stepped output drive shaft 135, supported by high speed roller bearings 138 carried by features of the enclosure 128, and extends outwardly there from into a pumping chamber 140 formed by a housing 142 of a centrifugal compressor 144. A compressor wheel 146 is carried for rotation with the output drive shaft 136 and, in operation, draws air in through an inlet port 148, compresses it, and discharges the compressed air through an outlet port 150.

A seal assembly 152 disposed concentrically with the output drive shaft 136 includes a base member 153 formed by two axially spaced parallel flanges 154 and 156 integrally interconnected by a neck region 158. Flange 154 forms a portion of the enclosure assembly 128 and provides a robust mount for the gear set bearings 138. Flange 156 forms a portion of the centrifugal compressor housing 144 and defines a portion of the pumping chamber 140. A stepped through-bore 160 extends axially through base member 153 providing a passageway interconnecting the cavity 135 of enclosure 128 and the pumping chamber 140 of the compressor housing 142. A vent passage 162 formed approximately midway in the neck region 158 extends radially outwardly from the through-bore 160 to the outer circumferential surface 164 of the neck region 158. This provides an atmospheric vent from the axial mid point of the through-bore 160. A chambered, compound seal 166 is fit within the through-bore 160 concentric with the output drive shaft 136.

Figure 4C:
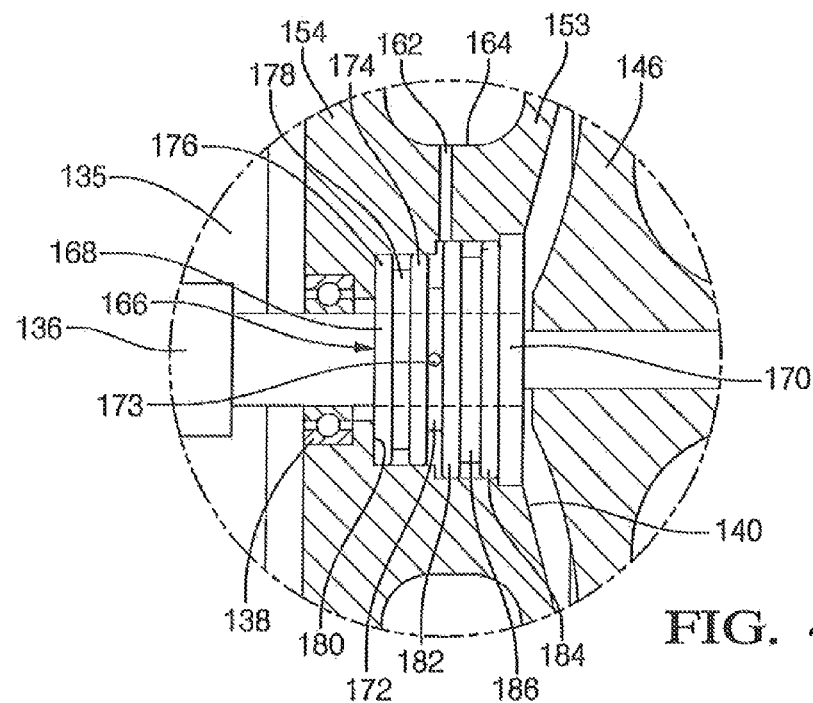

As best seen in FIG. 4C, the compound seal 166 includes a first seal portion 168 disposed intermediate the portion of the through-bore 160 opening within hydraulic cavity 135 and the atmospheric vent 162, and a second seal portion 170 disposed intermediate the portion of the through-bore 160 opening within the compressor pumping chamber 140 and the atmospheric vent 162. The seal portions 168 and 170 are axially spaced by a necked region 172 of the compound seal 166 which axially registers with the atmospheric vent 162. A plurality of bearing vent holes 173 (one illustrated) are circumferentially arranged about the necked region 172. The first seal portion 168 is formed by inner and outer flange portions 174 and 176, respectively, axially spaced by a necked region 178. The second seal portion 170 is formed by inner and outer flange portions 182 and 184, respectively, axially spaced by a necked region 186. The compound seal 166 is fixedly positioned within the through-bore 160 by being pressed axially (leftwardly as illustrated) into abutment with at least one rightwardly-facing step 180 of through-bore 160.

Referring to FIG. 4C, detail of the seal 166 isolating the hydraulic system from the engine air intake system will be explained. Given that it is often preferred to have the compressor between the throttle and the engine to improve drivability, the compressor side of the seal will experience both vacuum when at the engine is at idle as well as full boost when the supercharger drive is activated. There is also some pressurization which occurs in the hydraulic reservoir as the oil heats and expands. Given these varying pressure gradients and the generally negative consequences of the hydraulic system and engine air intake system intermingling there is a need for some level of isolating the two systems. There is thus provided a bronze seal which has a very tight diametral clearance on order of 0.015 mm with the high speed compressor shaft as opposed to a larger clearance between the bearing and housing on order of 0.200 mm. At the interface to the bearing/compressor housing there are two polymeric seals to allow for a slight movement of the seal within the housing to better accommodate alignment with the shaft while still maintaining an oil/air tight seal at the periphery. In the middle of the bronze bearing are several vent holes which connect the shaft bore to the cavity between the two seals. A vent hole is provided from this cavity through the housing to atmosphere. By scaling the vent hole to atmosphere much larger than the area created by the diametral clearance of the shaft and bearing a pressure of near atmosphere can be induced at the central portion of the shaft. In this manner the two systems can be prevented from inducing pressure or vacuum upon each other.

Figure 5A:
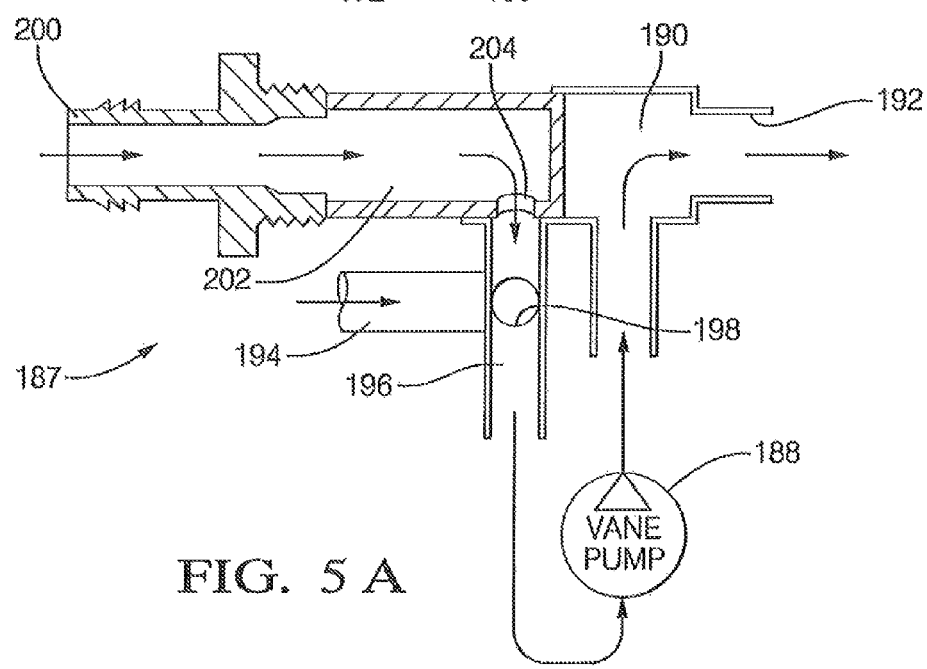
FIG. 5a, is a diagram of a pump modification used in the system.
Figure 5:
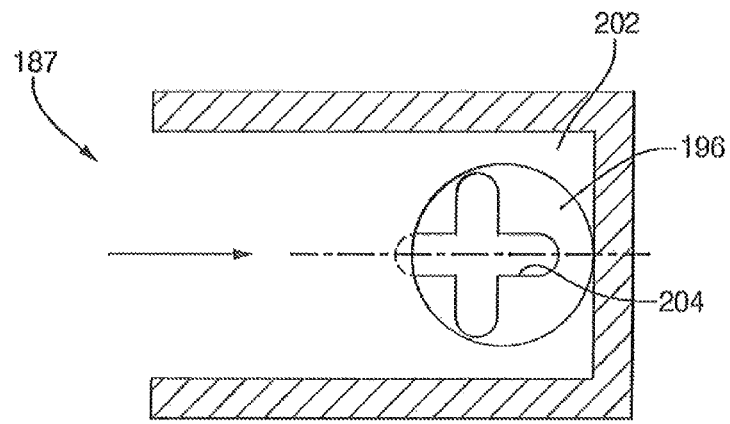
Figure 5:
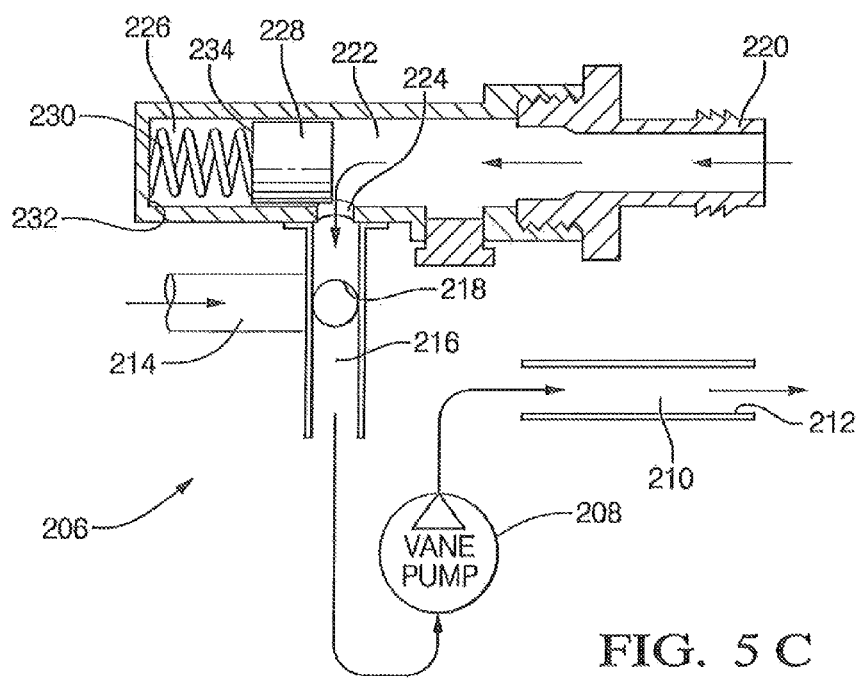

Referring to FIG. 5A, a hydraulic pump flow regulation system 187 is illustrated. A hydraulic pump 188 discharged hydraulic fluid into a flow directing chamber or passageway 190 defining an outlet 192. Returning hydraulic fluid is fed to the pump 188 from two sources, a reservoir return line 194 feeding into an inlet mixing manifold 196 through an open port 198, and a system return flow line 200 feeding hydraulic fluid into a flow regulating chamber 202 feeding the inlet mixing manifold 196 through a flow restricting orifice or boost nozzle 204. Orifice 204 can be sized and shaped as illustrated in FIG. 5B to restrict flow rate and provide a venturi effect.

Referring to FIG. 5C, an alternative hydraulic fluid pump flow regulation system 206 configured from a modified automotive power steering pump is illustrated. A hydraulic pump 208 discharges hydraulic fluid into a flow directing chamber or passageway 210 defining an outlet 212. Returning hydraulic fluid is fed to the pump 208 from two sources, a reservoir return line 214 feeding into an inlet mixing manifold 216 through an open port 218, and a system return flow line 220 feeding hydraulic fluid into a flow regulating chamber 222 feeding the inlet mixing manifold 216 through a flow restricting orifice or boost nozzle 224. Orifice 224 can be sized and shaped to restrict flow rate and provide a venturi effect. Flow regulating chamber 222 extends (leftwardly) beyond the orifice 224 to define a blind end portion 226. Blind end portion 226 contains a regulating piston 228 slidably disposed therein. A compression spring 230 simultaneously bears in one direction against an end wall 232 of the chamber 222 and in an opposite direction against the right-facing end wall 234 of the piston 228. The pressure of the hydraulic fluid within the chamber 222 will actively offset the effect of the compression spring 230. The piston 228 is dimensioned to partially overlay the orifice 224 creating a variable geometry orifice as a function of instantaneous hydraulic fluid pressure in the chamber 222.

Hydraulic flow for the supercharger drive is provided by the hydraulic pump as shown in FIGS. 5A-C. A vane pump is the preferred embodiment due to its inherent low noise, good efficiency, low cost, and relatively small package size. The pump is belt driven off the engine's accessory drive and must operate at speeds of approximately 900 to 9000 RPM. A vane pump of the flow capacity required for this application will typically cavitate at rotational speeds such as these. To avoid this problem it is the preferred embodiment of this invention to direct the flow into the pump as shown in FIG. 5A. Note that oil is directed into the pump from two sources. Flow from the reservoir is typically about 2 GPM. This is the flow from the steering rack that passed through the cooler and reservoir. The remaining flow needed by the pump enters through the system return line. This is the flow that was used by the supercharger motor but did not go through the steering rack. Note that this flow is directed into the pump through a new port added to the pump. This flow passes through a spool that can be axially positioned by rotation of the inlet fitting. This movement adjusts the size (area) of the boost nozzle thereby generating a high velocity jet of oil directed into the inlet of the rotating rotor/vanes. The high velocity jet boosts the inlet pressure of the pump and prevents cavitation at all operating speeds.

FIG. 5B shows a more detailed view of the boost nozzle. It was found through numerous tests that best results were obtained by a "cross" shaped orifice. This design created the highest boost pressure with the least back pressure and allowed the pump to operate at speeds of over 9000 RPM without cavitating.

An alternate means was found to provide the boost to the pump inlet as shown in FIG. 5C. In this embodiment return flow which was not used by the steering system is directed into what would normally be the output port of a pump of typical automotive steering pump construction. The normal passage leading from the rotating pumping mechanism to the spool bore is now blocked and a new pump output port is constructed on the back cover or wherever convenient. The spring and spool which would normally define the flow control in steering pump construction now create a spring loaded mechanism which comprises the boost geometry. This was found to work better than the fixed geometry boost nozzle and required less modification of the automotive steering pump.

Figure 6A:
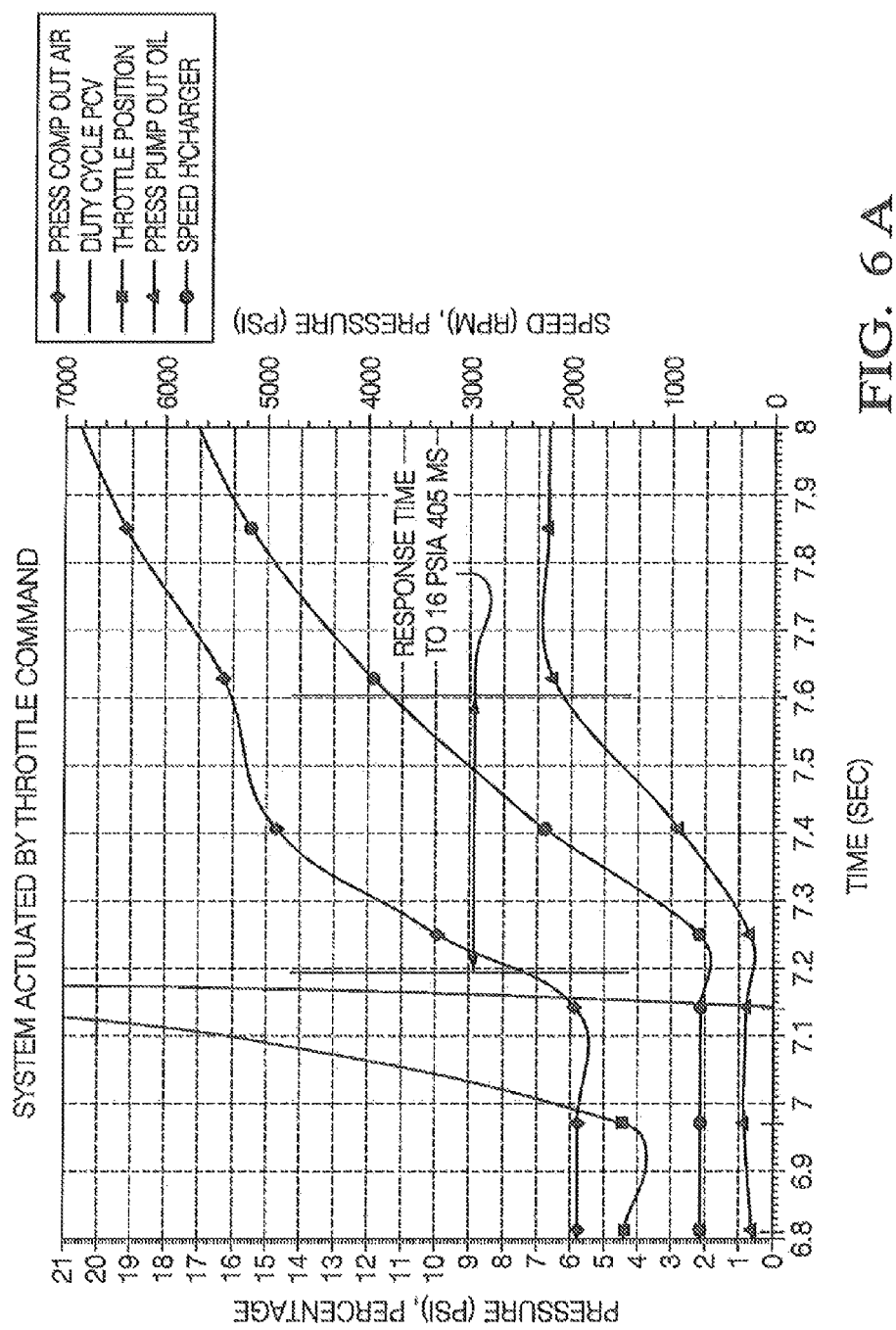
FIG. 6a, indicates response time of system on a vehicle.
Figure 6B:
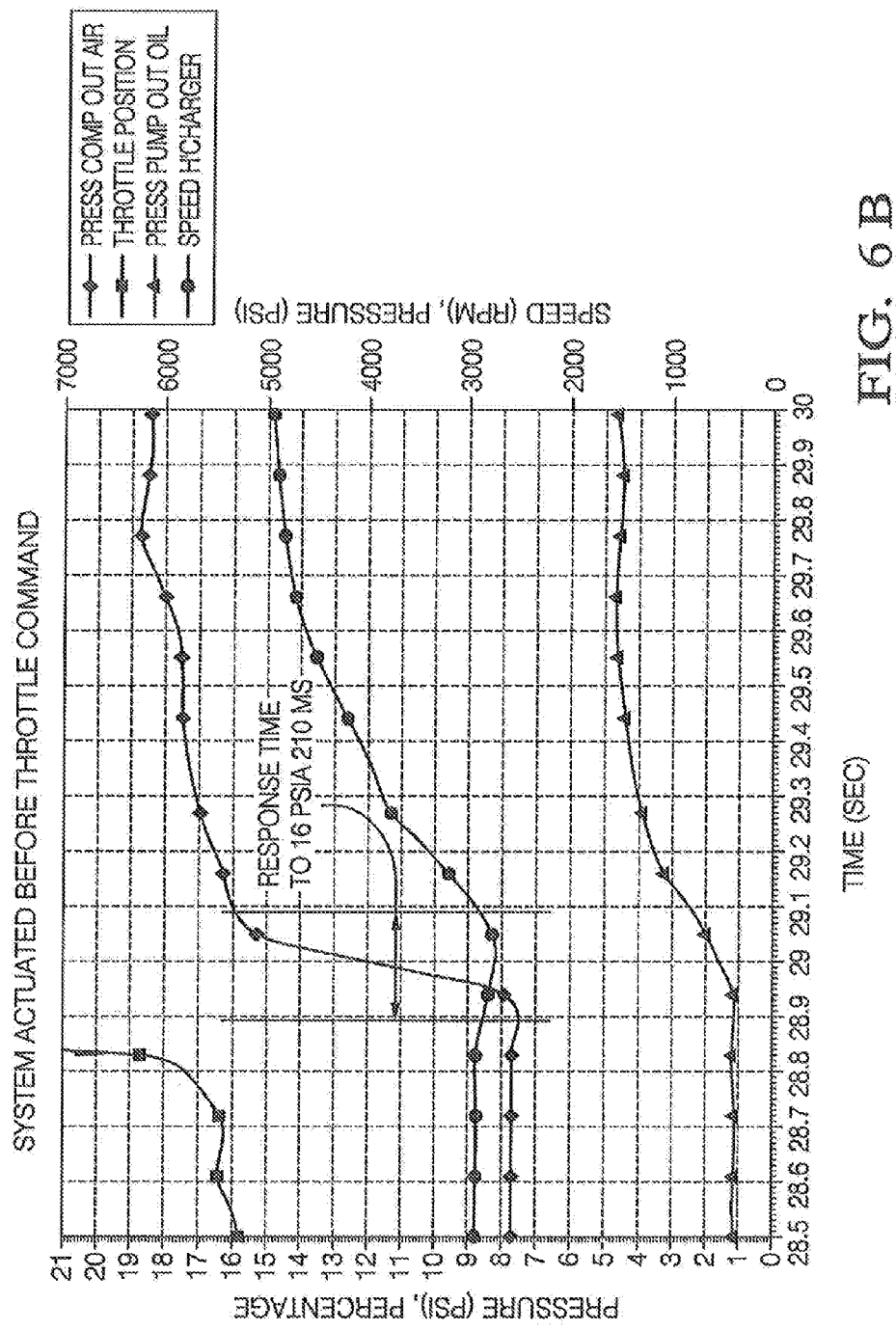
FIG. 6b, depicts the improvement in response time with pre-throttle actuation.

Now viewing from the vehicle system perspective, the hydraulic supercharger drive response time can be reduced by providing a signal from the brake or clutch pedal to activate the system in anticipation of throttle actuation. It is an extremely important aspect of a vehicular forced air induction system to provide immediate boost upon throttle command however, given that the hydraulic supercharger drive consumes energy it is advantageous to remain in quiescent mode whenever possible. Accordingly after remaining in quiescent mode during a period of engine idle, the system could gain a highly critical 300-500 ms head start by activating the hydraulic valves upon signal obtained by release of the clutch or brake pedal rather than awaiting a throttle command. System test data shown in FIGS. 6a and 6b illustrate the reduction in time from throttle actuation to 16 psia engine intake pressure, which is 1.5-2.0 psig, depending on barometric pressure. The signal to the system is not shown in FIG. 6B as it changed state before the 28.5 second graph start time and is now off the scale. It also should be noted that in contrast to FIG. 3, where response times to centrifugal compressor speed with equivalent steady state boost pressure were defined, the data in FIGS. 6A and 6B are representative of actual test vehicle data where the volume of the intake system must be pressurized prior to measureable pressure rise.

As can be seen the response is some 195 ms shorter when the system has been activated in advance of the throttle command. This function might well be one of the parameters activated when the driver switches the vehicle from fuel economy to performance mode.

The following documents are deemed to provide a fuller disclosure of the inventions described herein and the manner of making and using same. Accordingly, each of the below-listed documents are hereby incorporated in the specification hereof by reference:

U.S. Pat. No. 5,535,845 to J. Buschur entitled "Automotive Hydraulic System and Method".

U.S. Pat. No. 5,561,978 to J. Buschur entitled "Hydraulic Motor System".

U.S. Pat. No. 5,669,461 to J. Buschur entitled "Automotive Hydraulic System and Method".

U.S. Pat. No. 5,687,568 to J. Buschur entitled "Hydraulic Motor System".

U.S. Pat. No. 5,778,693 to M. Mientus entitled "Automotive Hydraulic Engine Cooling System with Thermostatic Control by Hydraulic Actuation".

U.S. Pat. No. 5,881,630 to J. Buschur et al. entitled "Apparatus and Method of Controlling Fluid Flow between a Plurality of Vehicle Components".

U.S. Pat. No. 5,946,911 to J. Buschur et al. entitled "Fluid Control System for Powering Vehicle Accessories".

U.S. Pat. No. 5,960,628 to K. Machesney et al. entitled "Hydraulically Powered Fan and Power Steering in Vehicle".

U.S. Pat. No. 5,960,748 to J. G. Lewis entitled "Vehicle Hydraulic Component Support and Cooling System".

U.S. Pat. No. 6,016,657 to J. Buschur entitled "Automotive Hydraulic System and Method".

U.S. Pat. No. 6,021,641 to J. Buschur et al. entitled "Hydraulically Powered Fan System for Vehicles".

U.S. Pat. No. 6,158,216 to J. Buschur et al. entitled "Hydraulically Powered Fan System for Vehicles".

U.S. Pat. No. 6,308,665 B1 to J. G. Lewis entitled "Vehicle Hydraulic Component Support and Cooling System".

U.S. Pat. No. 6,612,822 B2 to J. Buschur et al. entitled "Hydraulic Motor System".

U.S. Pat. No. 6,629,411 B2 to J. Buschur et al. entitled "Dual Displacement Motor Control".

U.S. Pat. No. 7,608,011 B2 to Grabowski et al. entitled "Hydrogen Fueled Hybrid Powertrain and Vehicle".

U.S. Pat. No. 7,490,594 B2 to Van Dyne et al. entitled "Super-Turbocharger".

U.S. Pat. No. 7,481,056 B2 to Blaylock et al. entitled "Turbocharger with Adjustable Throat".

U.S. Pat. No. 7,111,704 B2 to Johnson entitled "Hydrostatic Drive Apparatus for a Road Vehicle".

U.S. Pat. No. 6,502,398 B2 to Kapich entitled "Exhaust Power Recovery System".

U.S. Pat. No. 6,412,278 B1 to Matthews entitled "Hydraulically Powered Exhaust Gas Recirculation System".

U.S. Pat. No. 5,724,949 to C. Liang entitled "Hydraulic Drive for a Pressure Wave Supercharger Utilized with an Internal Combustion Engine".

U.S. Pat. No. 5,346,364 to D. Kapich entitled "Very High Speed Hydraulic Turbine Drive". And U.S. Pat. No. 4,729,225 to J. Bucher entitled "Turbo-Charged Internal Combustion Engine with Exhaust Gas Energy Recuperation".

It is to be understood that the invention has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for illustrative purposes and convenience and are not in any way limiting, the invention, which is defined by the following claims as interpreted according to the principles of patent law, including the Doctrine of Equivalents, may be practiced otherwise than is specifically described.

The invention claimed is:

1. A hydraulically driven forced air induction system operative to boost inlet air pressure of a vehicle combustion system, said system comprising:
   a centrifugal compressor operative to compress combustion system inlet air;
   a first positive displacement hydraulic motor including an output drive shaft drivingly engaging said centrifugal compressor through a speed increaser mechanism operative to drive said centrifugal compressor at a rotational rate exceeding the rate of said first motor output drive shaft;
   a second positive displacement hydraulic motor including an output drive shaft arranged to engage and drive said speed increaser mechanism to drive said centrifugal compressor at a rotational rate exceeding the rate of said second motor output drive shaft; and
   a hydraulic control circuit operative to change the output speed of the speed increaser mechanism to the compressor as a function of vehicle demand by restricting inlet flow to either or both of said motors and/or bypassing flow around either or both of said motors,
   wherein said hydraulic control circuit includes a flow control and a pressure relief mechanism operable to host a hydraulically assisted steering system positioned in series configuration downstream of said first and second positive displacement hydraulic motors and series or parallel restrictions associated with said forced air induction system.

2. A hydraulically driven forced air induction system operative to boost inlet air pressure of a vehicle internal combustion system, said system comprising:
   a centrifugal compressor disposed within a compressor housing operative to compress system inlet air; and
   a positive displacement hydraulic motor drivingly engaging an axle of said centrifugal compressor through a speed increaser mechanism operative to drive said centrifugal compressor at a rotational rate exceeding an instantaneous rotational rate of said positive displacement hydraulic motor,
   wherein said speed increaser mechanism is housed in an enclosure containing hydraulic fluid, and/or comprising a hydraulic fluid reservoir, in which the centrifugal compressor is integrated, and
   wherein said centrifugal compressor axle passes through a first circumferential restriction exiting said speed increaser mechanism enclosure, entering a volume which is substantially vented to atmosphere and then passing through a second circumferential restriction as it enters the compressor housing.

3. The hydraulically driven forced air induction system of claim 2, wherein said centrifugal compressor or said speed increaser have a shaft housed in an extended vertical walled enclosure which passes upward from the centrifugal compressor through the oil volume to engage said speed increaser above the level of the oil.

4. A hydraulically driven forced air induction system operative to boost inlet air pressure of a vehicle combustion system, said air induction system comprising:
   a centrifugal compressor operative to compress system inlet air;
   a plurality of positive displacement hydraulic motors, each positive displacement hydraulic motor having a characteristic displacement or torque/pressure relationship to said centrifugal compressor and drivingly engage said centrifugal compressor through a speed increaser mechanism;
   a single hydraulic circuit operable to selectively restrict direct hydraulic fluid flow to one or more of said plurality of positive displacement hydraulic motors and to selectively bypass at least one of said positive displacement hydraulic motors; and
   a hydraulic circuit control mechanism operative to sense a vehicle operator demand and to sequentially decrement an aggregate characteristic displacement or torque/pressure relationship of said plurality of positive displacement hydraulic motors to said centrifugal compressor in response to an increase in operator demand.

5. The hydraulically driven forced air induction system of claim 4, wherein said centrifugal compressor comprises a portion of a turbocharger system including a turbine and compressor wheel carried for rotation on a common shaft, said turbine driven by exhaust gas from said combustion system for effecting rotation of said compressor wheel to compress said system inlet air.

6. The hydraulically driven forced air induction system of claim 5, further comprising an escapement mechanism interconnecting said positive displacement hydraulic motors to said centrifugal compressor, and to enable the turbine to turn the centrifugal compressor at a rotational rate higher than provided by combination of said positive displacement motors and said speed increaser mechanism.

7. The hydraulically driven forced air induction system of claim 4, wherein said single hydraulic circuit includes a flow control and a pressure relief mechanism operable to host a hydraulically assisted steering system positioned in series configuration downstream of said first and second positive displacement hydraulic motors and series or parallel restrictions associated with said forced air induction system.

8. The hydraulically driven forced air induction system of claim 4, further comprising an hydraulic system fluid reservoir, wherein said speed increaser mechanism is housed in a cavity formed by a portion of said hydraulic system reservoir.

9. The hydraulically driven forced air induction system of claim 8, wherein a portion of said speed increaser mechanism is disposed above an operating fluid level in said hydraulic system fluid reservoir.

10. The hydraulically driven forced air induction system of claim 4, wherein said centrifugal compressor is drivingly engaged by an exhaust driven turbocharger.

11. The hydraulically driven forced air induction system of claim 4, wherein at least one of said plurality of positive displacement hydraulic motors is of gerotor or epicycloidal construction.

12. The hydraulically driven forced air induction system of claim 4, wherein said speed increaser mechanism comprises either a two stage helical gear mechanism or a reverse worm drive.

13. The hydraulically driven forced air induction system of claim 4, wherein each of said plurality of positive displacement hydraulic motors has an output including drive gears engaging a common gear associated with the speed increaser mechanism.

14. The hydraulically driven forced air induction system of claim 4, further comprising an overriding clutch interconnecting at least one of said plurality of positive displacement hydraulic motors with said speed increaser mechanism.

15. The hydraulically driven forced air induction system of claim 4, further comprising a vehicle operator control system including a control module configured to receive discrete input signals from at least one of a host vehicle throttle position sensor, a host vehicle clutch position sensor and a host vehicle brake pedal position sensor, said vehicle operator control system operative to change an operational state of said centrifugal compressor in response to a signal from the host vehicle clutch position sensor and/or the host vehicle brake pedal position sensor, and in advance of an anticipated host vehicle throttle actuation.

16. The hydraulically driven forced air induction system of claim 15, wherein said vehicle operator control system further comprises a vehicle performance mode select switch operable to establish a "sport mode" of control wherein said vehicle operator control system is operative to alter an operational state of said centrifugal compressor solely in response a host vehicle throttle actuation, and an "economy mode" of control wherein said vehicle operator control system is operative to alter an operational state of said centrifugal compressor in response to a signal from the host vehicle clutch position sensor and/or the host vehicle brake pedal position sensor.

17. The hydraulically driven forced air induction system of claim 4, wherein said plurality of positive displacement hydraulic motors comprise a first positive displacement hydraulic motor having a first characteristic displacement and a second positive displacement hydraulic motor having a second characteristic displacement, and wherein said hydraulic circuit control mechanism is operative to restrict fluid flow to only one of said first and second positive displacement hydraulic motors.

18. The hydraulically driven forced air induction system of claim 17, wherein one of said first and second positive displacement hydraulic motors has a characteristic displacement 1.5 to 2.5 times the characteristic displacement of the other of said first and second positive displacement hydraulic motors, and the hydraulic control mechanism is operative to direct fluid flow to both of said first and second positive displacement hydraulic motors initially upon start-up, and to restrict fluid flow to one of the said first and second fixed hydraulic motors as speed increases.

19. The hydraulically driven forced air induction system of claim 17, wherein one of the first and second positive displacement hydraulic motors has a characteristic displacement 1.5 to 2.5 times the characteristic displacement of the other of said first and second positive displacement hydraulic motors, and the hydraulic circuit control mechanism is operative to initially direct fluid flow to both of said first and second positive displacement hydraulic motors upon sensing said vehicle operator demand, and subsequently to limit fluid flow to the smaller positive displacement hydraulic motor at steady state.

20. The hydraulically driven forced air induction system of claim 17, wherein said first characteristic displacement of said first positive displacement hydraulic motor is equal to or less than said second characteristic displacement of said second positive displacement hydraulic motor, and wherein said hydraulic circuit control mechanism is operative to restrict fluid flow to only said first positive displacement hydraulic motor.

21. The hydraulically driven forced air induction system of claim 20, wherein said first characteristic displacement of said first positive displacement hydraulic motor is less than 70% of said second characteristic displacement of said second positive displacement hydraulic motor.

22. The hydraulically driven forced air induction system of claim 4, further comprising:
  a portion of a turbocharger system including a turbine and compressor wheel carried for rotation on a common shaft, said turbine driven by exhaust gas from said combustion system for effecting rotation of said compressor wheel to compress said system inlet air; and
  an escapement mechanism interconnecting said speed increaser mechanism to said compressor wheel, said escapement mechanism operative to allow said turbine to turn said compressor wheel at a rotational rate higher than provided by combination of said motors and speed increaser mechanism,
  wherein hydraulic fluid flow to said plurality of positive displacement hydraulic motors and said single hydraulic circuit comprise an upper hydraulic load in a series circuit arrangement driven by a single hydraulic pump in which a host vehicle power steering system comprises a lower hydraulic load of said circuit,
  wherein said air induction system further comprises a hydraulic system reservoir, wherein said speed increaser mechanism is disposed in a cavity formed by a portion of the hydraulic system reservoir,
  wherein a portion of the speed increaser mechanism is packaged above the operating fluid level in the hydraulic system reservoir,
  wherein the shaft comprising the output of the speed increaser and axle for the centrifugal compressor passes through a circumferential restriction leaving the reservoir and another circumferential restriction entering the compressor enclosure with a region open to or substantially vented to atmosphere in between, wherein the hydraulic control circuit includes a mechanism which restricts the flow to only one of the two positive displacement motors, wherein the displacement of the restricted motor is equal to or less than that of said other said motor, wherein the displacement of the restricted motor is less than 70% of that of the unrestricted motor, and wherein one of said two fixed hydraulic motors has a displacement 1.5 to 2.5 times the displacement of the smaller and the hydraulic circuit control mechanism directs flow to both motors initially upon start-up, and as speed of the output becomes limited by flow availability, flow is restricted to one of the two motors.

* * * * *